United States Patent
Khan et al.

(10) Patent No.: US 9,451,036 B2
(45) Date of Patent: Sep. 20, 2016

(54) METHOD AND APPARATUS FOR FINGERPRINTING SYSTEMS AND OPERATING SYSTEMS IN A NETWORK

(75) Inventors: Faud Khan, Osgoode (CA); Gerald Batten, Ottawa (CA); Yong Sun, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 2471 days.

(21) Appl. No.: 12/008,856

(22) Filed: Jan. 15, 2008

(65) Prior Publication Data

US 2009/0182864 A1 Jul. 16, 2009

(51) Int. Cl.
*G06F 15/173* (2006.01)
*H04L 29/08* (2006.01)
*H04L 12/24* (2006.01)
*H04L 29/12* (2006.01)

(52) U.S. Cl.
CPC .............. *H04L 67/22* (2013.01); *H04L 12/24* (2013.01); *H04L 29/12509* (2013.01); *H04L 41/00* (2013.01); *H04L 41/12* (2013.01); *H04L 61/2567* (2013.01); *H04L 67/306* (2013.01)

(58) Field of Classification Search
CPC .................................................. H04L 63/0876
USPC ......... 709/220–226, 233, 239; 370/252, 389, 370/238
See application file for complete search history.

(56) References Cited

U.S. PATENT DOCUMENTS

| | | | | |
|---|---|---|---|---|
| 2003/0093563 A1* | 5/2003 | Young et al. | ................. | 709/245 |
| 2007/0011319 A1* | 1/2007 | McClure et al. | ............. | 709/224 |
| 2007/0157303 A1* | 7/2007 | Pankratov | ........................ | 726/11 |
| 2007/0297349 A1* | 12/2007 | Arkin | ............................ | 370/255 |
| 2009/0037353 A1* | 2/2009 | Greenwald et al. | ............ | 706/20 |

OTHER PUBLICATIONS

Anonymous, "Time has something to tell us about Network Address Translation", Jul. 2007, pp. 1-6.*
Arkin et al., "The Present and Future of Xprobe2 The Next Generation of Active Operating System Fingerprinting", Jul. 2003, pp. 1-35.*
Alexandre Pankratov (Allen et al., "OS and Application Fingerprinting Techniques", SANS Institute, Sep. 22, 2007, pp. 1-49).*

(Continued)

*Primary Examiner* — John Macilwinen
(74) *Attorney, Agent, or Firm* — Fay Sharpe, LLP

(57) ABSTRACT

A system and method for identifying the number of computer hosts and types of operating systems behind a network address translation is provided. The method includes processing an internet protocol packet associated with the host computer system. The process may involve capturing the internet protocol packet and extracting key fields from the internet protocol packet to produce a fingerprint. The method continues with analyzing the fields in order to determine if a network address translator is connected between the host computer and a public network (e.g. the internet). If there is a network address translator connected, fields may be analyzed in order to determine the number of computers using the network address translator. The fields may also be analyzing in order to determine with a level of probability that the fingerprint identifies the correct operating system running the host computers. Generally, the internet protocol packet that is analyzing will be captured from an aggregation point in the carrier network.

18 Claims, 7 Drawing Sheets

OS FINGERPRINT TABLE 45

| OPERATING SYSTEM | DESCRIPTION | WINDOW SIZE | TTL | DF | IP OPTIONS | ICMP ECHO REQUEST PAYLOAD LENGTH | ICMP ECHO REQUEST PAYLOAD PATTERN | MSS |
|---|---|---|---|---|---|---|---|---|
| XP SP 2 | MICROSOFT WINDOWS XP SERVICE PACK 2 | 65535 | 128 | 1 | N | 32 | abcdefghi... | 1460 |
| LINUX 2.6 | RED HAT EL 4.0 | 4*MSS | 64 | 1 | N | 56 | (!"#$%&'()*+,-./1234567 | 1460 |
| VISTA | MICROSOFT WINDOWS VISTA | 8192 | 128 | 1 | N | 32 | abcdefghi... | 1460 |

(56) References Cited

OTHER PUBLICATIONS

T. Kohno and K. Claffy. "Remote Physical Device Fingerprinting". IEEE Transactions on Dependable and Secure Computing. vol. 2, No. 2. Apr.-Jun. 2005. pp. 93-108.*

Z. Kwecka. "Application Layer Covert Channel Analysis and Detection". Napier University. 2006. pp. 1-138.*

PCT/IB2009/051974 PCT International Search Report, Mailed Feb. 9, 2010, 3 Pages.

PCT/IB2009/051974 Written Opinion of the International Searching Authority, Mailed Feb. 9, 2010, 6 Pages.

Zalewski, Dr. Jekyll had Something to Hyde [Online], Passive OS Fingerprinting Tool, Version 2.0.8, Sep. 6, 2006, Retrieved From http://lcamtuf.coredump.cx/p0f/readme on Jan. 26, 2010, pp. 1-11.

Bellovin, A Technique for Counting NATted Hosts, IMW '02, ACM, Nov. 6-8, 2002, pp. 267-272.

Reiter et al., Traffic Aggregation for Malware Detection, CMU-CyLab-07-017, Carnegie Mellon University, Dec. 16, 2007, 20 Pages.

Bursztein, "Time has something to tell us about Network Address Translation", Proceedings of the 12th Nordic Norkshop on Secure IT Systems (NordSec'07), Reykjavik, Iceland, Oct. 2007, 6 pp.

* cited by examiner

FIG. 3

SNOOP TABLE /25

| SUBSCRIBER ID | COMPUTER ID | CAPTURE ID | CAPTURE DATA |
|---|---|---|---|
| 12345-67890 | 02 | 00001 | /v6/windowsupdate/redir/wuredir.cab?0703090055 HTTP/1.1<br>Accept: */*<br>User-Agent: Windows-Update-Agent<br>Host: download.windowsupdate.com<br>Connection: Keep-Alive |
| 12345-67890 | 02 | 00002 | Message-id: <451AAE5F.2040107@alcatel.com><br>MIME-version: 1.0<br>Content-type: text/plain; format=flow; charset=us-ascii<br>Content-transfer-encoding: 7bit<br>X-Accept-Language: en-us, en<br>User-Agent: Mozilla/5.0 (Windows; U; Windows NT 5.1; en-US; rv:1.7.2) Gecko/20040804 Netscape/7.2(ax) |

FIG. 4

USER INDEX TABLE (35)

| SUBSCRIBER ID | COMPUTER ID | NAT DEVICE | OPERATING SYSTEM | PROBABILITY | VERIFIED |
|---|---|---|---|---|---|
| 12345-67890 | 01 | YES | XP SP 2 | 100 | YES |
| 12345-67890 | 02 | YES | VISTA | 60 | NO |

FIG. 5

OS FINGERPRINT TABLE — 45

| OPERATING SYSTEM | DESCRIPTION | WINDOW SIZE | TTL | DF | IP OPTIONS | ICMP ECHO REQUEST PAYLOAD LENGTH | ICMP ECHO REQUEST PAYLOAD PATTERN | MSS |
|---|---|---|---|---|---|---|---|---|
| XP SP 2 | MICROSOFT WINDOWS XP SERVICE PACK 2 | 65535 | 128 | 1 | N | 32 | abcdefghi... | 1460 |
| LINUX 2.6 | RED HAT EL 4.0 | 4*MSS | 64 | 1 | N | 56 | (!"#$%&'()*+,-./1234567 | 1460 |
| VISTA | MICROSOFT WINDOWS VISTA | 8192 | 128 | 1 | N | 32 | abcdefghi... | 1460 |

METHOD AND APPARATUS FOR FINGERPRINTING SYSTEMS AND OPERATING SYSTEMS IN A NETWORK

BACKGROUND OF THE DISCLOSURE

This disclosure relates to a fingerprinting system. More particularly, this disclosure relates to a method and apparatus that is able to identify the number of computers and types of operating systems associated with the computers behind a Network Address Translation (NAT) device in a network.

While this disclosure is particularly directed to analyzing traffic associated with operating systems behind a NAT device and thus will be described with particular reference thereto, it will be appreciated that the disclosure may have usefulness in other fields and applications. For example, this disclosure may be useful in a variety of services that have a need for identifying aspects of computing devices where these aspects may otherwise remain hidden through conventional means.

By way of background, a NAT device is commonly used in Internet Protocol (IP) translation and mapping technology. These devices are often used to allow networks to share internet access among a plurality of devices. However, a NAT device may also be used as an interpreter between two networks even with only one device behind it. NAT devices are used to open a conduit between one computer and a destination computer. The destination computer is commonly accessed through the internet. When the destination computer returns results from a computing device's request, it is passed back through a NAT device. Generally, the NAT device will disguise the computing or computing devices behind it so that the public computer only recognizes the address of the NAT device. In this form, the NAT device appears to be the source of the traffic. Reliably detecting NAT devices can be difficult because they are virtually indistinguishable from the host computers. However, many organizations depend on this hidden demographical information for marketing purposes. Furthermore, disguised computers attack sites because it is less likely that they will be discovered.

The industry has developed methods of fingerprinting the computing systems that are ordinarily hidden behind a NAT device. One of these developments includes Passive Operating System fingerprinting (POS). POS is an open source solution that that only permits a network administrator or user to configure the software which identifies computer systems that visit the site being monitored. This methodology uses a computer system that captures packets targeting a site or servers. The traffic analyzed focuses on certain aspects of IP packets.

Current fingerprinting methods analyze traffic with a focus on Time To Live (TTL), Type of Service (ToS), Don't Fragment (DF) and Maximum Segment Size (MSS) aspects of IP packets. However, current methods in the industry do not focus on aspects such as application layer information and IP details. There is, however, a need in the industry for a network system and method that is able to analyze these aspects. This system and method would allow for packets to be collected at an aggregation point which could in turn lead to information which determines the number of computers behind a NAT device. Furthermore, there is a need in the industry for a system that can collect IP packets and analyze them in a way to form a conclusion (or at minimum, a probability) about which operating systems are being run by host computers. There is also a need in the industry for a system and a method which can attempt fast fingerprinting of the traffic with a more intelligent checking and monitoring system. This system and method would determine a more precise estimation of which operating systems are being run by disguised host computers.

The present disclosure contemplates a new and improved system and method which resolves the above-referenced difficulties and others.

SUMMARY OF THE DISCLOSURE

A method and apparatus for identifying the number of host computers and types of operating systems being run on those computers behind a network address translator is provided. This disclosure will allow for fast fingerprinting which will detect the number of host computers behind a NAT device and the operating system in which those computers are running with a level of probability. The system extracts key fields from a captured IP packet and uses those fields (e.g. TTL) in order to determine if a NAT device exists. If a NAT device does exist, these key fields will be used in order to determine the number of host computers behind the NAT device through Transport Control Protocol (TCP) fingerprinting. If this method does not determine a positive fingerprint then additional application information may be used in order to create an application fingerprint. If the application fingerprint does not determine a positive fingerprint, then update request information data may be used to create yet another fingerprint in order to determine a probability that a host computer is using a specific kind of operating system.

In one aspect of the present disclosure a method for identifying the number of computers and types of operating systems behind a network address translation comprises processing an IP packet associated with a computer system. Processing includes capturing the IP packet and extracting fields from the IP packet in order to produce a fingerprint. The method continues with analyzing the fields to determine if an associated network address translator device is connected between the host computer and a network. If the network address translator device is connected analyzing the fields in order to determine the number of host computers using the network address translator device and analyzing the fields in order to determine with a level of probability that the fingerprint identifies an operating system running at least one of the host computers.

In accordance with another aspect of the present disclosure, the method includes processing update requests from the operating system in order to further define the level of probability that a fingerprint identifies the operating system running the host computer.

In accordance with another aspect of the present disclosure, the method includes accessing application data in order to further define the level of probability that the fingerprint identifies the operating system running the host computer.

In accordance with another aspect of the present disclosure, the method includes recording user information into a user index table and generating a user index profile for the user index table if a user has not been previously fingerprinted.

In accordance with another aspect of the present disclosure, the method includes that analyzing the field includes comparing captured values from the internet protocol packet to value stored for known operating systems.

In accordance with another aspect of the present disclosure, the method includes that comparing captured values includes accessing an operating system fingerprint table.

In accordance with another aspect of the present disclosure, the method includes that when comparing captured values utilizing a logic tree.

In accordance with another aspect of the present disclosure, the method includes that hash values are used when comparing values.

In accordance with another aspect of the present disclosure, the method for analyzing traffic comprises capturing a packet from a data path between a host and a network, extracting application data, update request information and operating system key fields from the packet. The method further includes that if a network address translation device is providing access to the network determining the number of hosts associated with the network address translation device. The method also includes accessing operating system key fields in order to perform a transmission control protocol fingerprint. If the transmission control protocol fingerprint is not positive, using application data in order to perform an application fingerprint, and if the application fingerprint is not positive, the method further includes redefining the application fingerprint using update request data.

In accordance with another aspect of the present disclosure, the method includes that operating system key fields includes a time differential.

In accordance with another aspect of the present disclosure, the operating system key fields also includes an internet protocol identifier.

In accordance with another aspect of the present disclosure, the method further includes accessing a user index table for verification that the user's operating system has not been previously been verified.

In accordance with another aspect of the present disclosure, if the fingerprint is positive, it will have a substantially 100% probability of identifying an operating system.

In accordance with another aspect of the present disclosure, a system for identifying the number of computers and types of operating systems behind a NAT device comprises a network user fingerprinter configured to capture internet protocol packets used in obtaining a fingerprint. The system also includes extraction module adapted to obtain update request data, application information and key fields from the internet protocol packets and a processor configured to analyze the time to live number from the key fields of the internet protocol packets in order to determine the presence of a NAT device.

In accordance with another aspect of the present disclosure, the system includes that the network user fingerprinter is further adapted to focus on traffic at a network traffic aggregation point.

In accordance with another aspect of the present disclosure, the system includes that the network traffic aggregation point is located between the network address translation device and an associated public network.

In accordance with another aspect of the present disclosure, the system includes that the processor that is further configured to determine the number of hosts utilizing the network address translation device.

In accordance with another aspect of the present disclosure, the system further includes a snoop table adapted to store captured information relating to operating systems that have been fingerprinted.

In accordance with another aspect of the present disclosure, the system includes an operating system fingerprint table including stored values for known operating systems which have been adapted to be dynamic and used for comparisons.

In accordance with another aspect of the present disclosure, the system includes a user index table configured to store IP packet closest matching operating systems and probability of accuracy.

DESCRIPTION OF THE DRAWINGS

The presently described embodiments exist in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 3 illustrates a snoop table according to one embodiment of the current disclosure;

FIG. 4 illustrates a user index table according to one embodiment under the current disclosure;

FIG. 5 illustrates an Operating System (OS) fingerprint table according to one embodiment according to the present disclosure;

DETAILED DESCRIPTION

Figure 1:
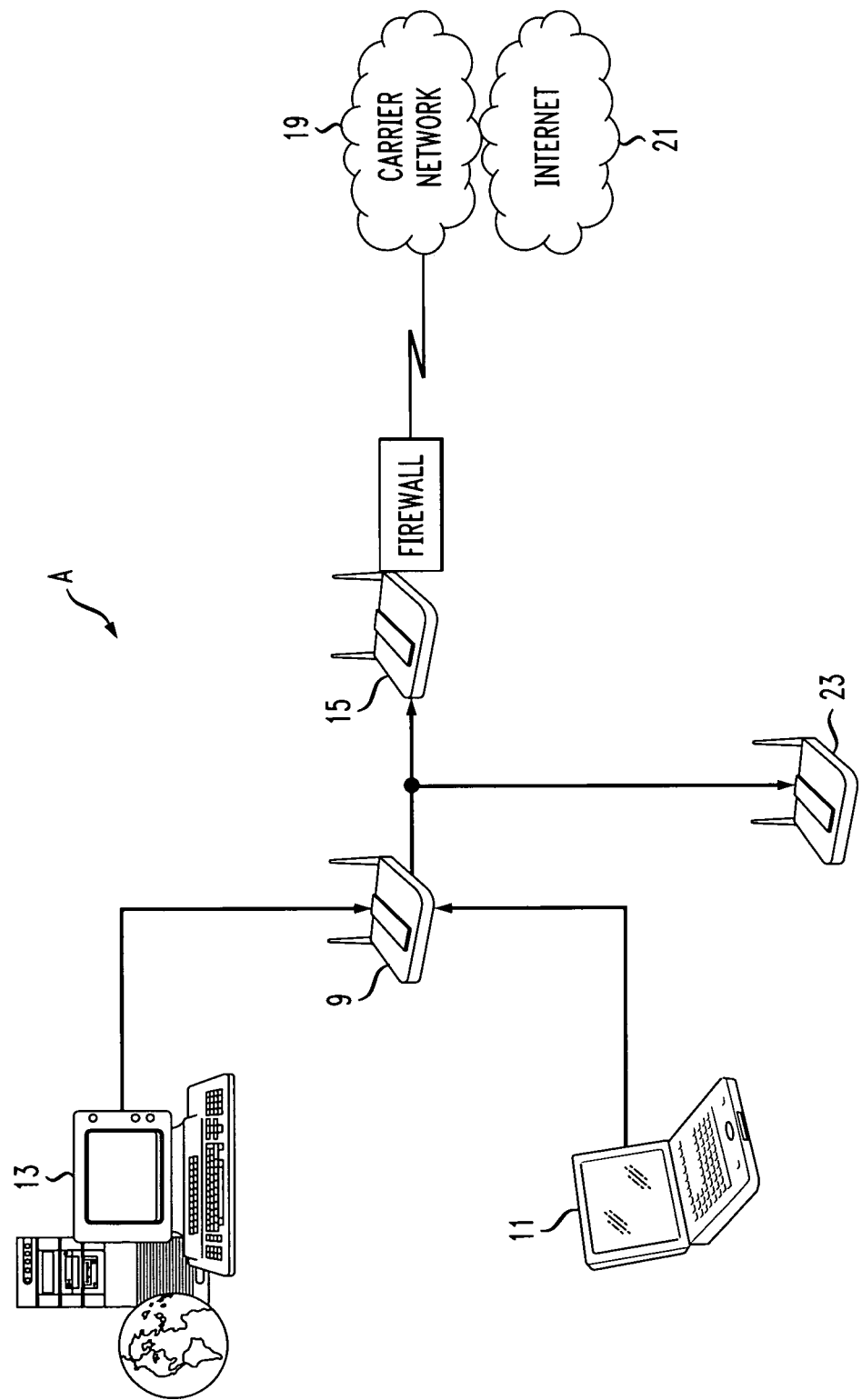
FIG. 1 illustrates a portion of an overall communications network according to prior art systems.

Referring now to the drawings wherein the showings are for purposes of illustrating the disclosed embodiments only and not for purposes of limiting the claimed subject matter. FIG. 1 provides an overall system that is currently in use. The system includes a router 9, a host laptop computer 11, a host desktop computer 13, a NAT device 15, a carrier network 19, the internet 21 and a fingerprinter 23. This embodiment of prior art could also be incorporated in a variety of communication network configurations.

This network shows one method in which POF may be implemented. This system, however, is restricted to the target site only. FIG. 1 shows a system where a methodology may be incorporated which uses a computer system that captures packets targeting a site or servers. The traffic flowing through the system may be analyzed with the focus on TTL, TOS, DF and MSS aspects of IP packets. However, the system as shown, may not include application layer information in IP details. Therefore, the prior art is limited and it cannot add more layers of inspection. Furthermore, the art shown in FIG. 1 does not allow for the fingerprinter 23 to detect the number of PCs behind the NAT device 15.

Figure 2:
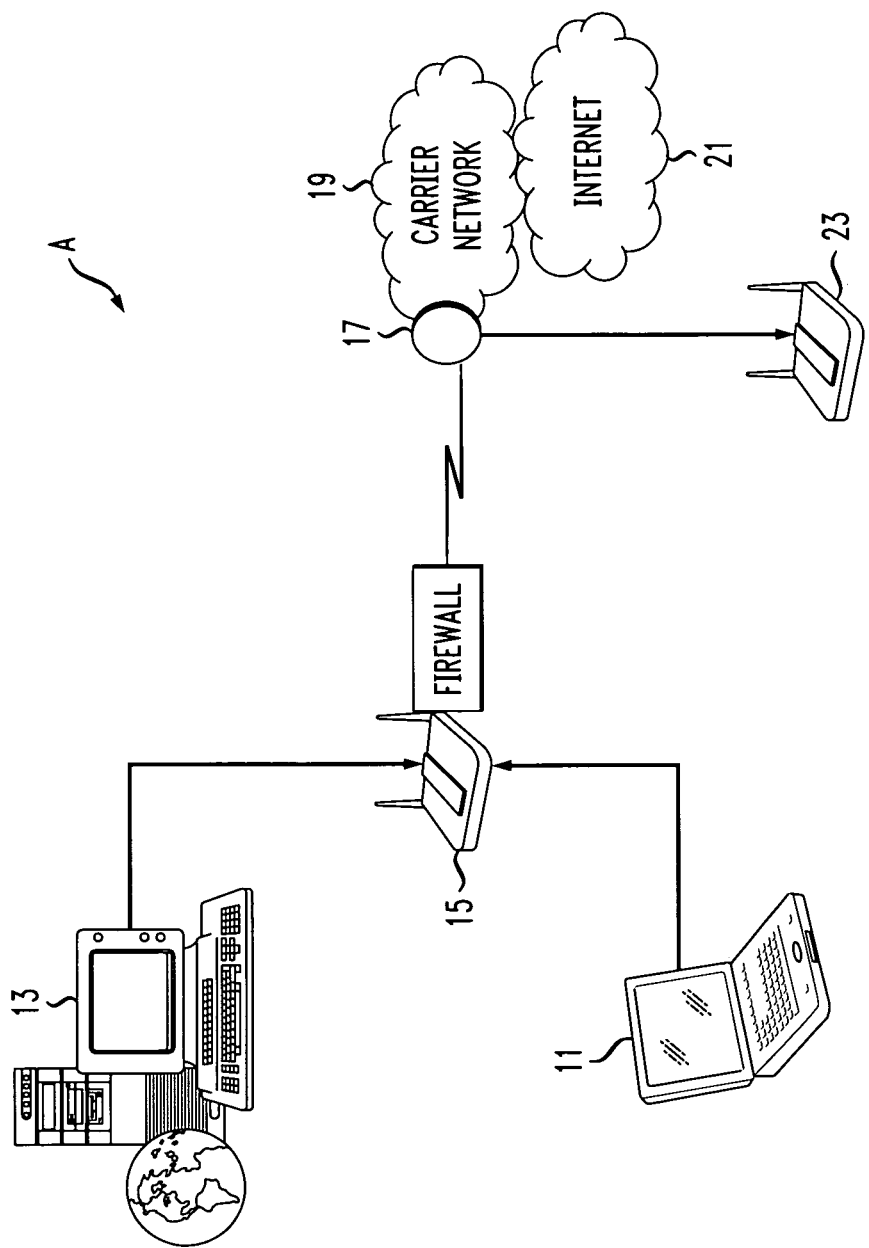
FIG. 2 illustrates a portion of the overall communications network according the present disclosure.

Now referring to FIG. 2, a communication infrastructure B which may implement the current disclosure is provided. This system includes a host laptop computer 11, a host desktop computer 13 behind a NAT 15 device. The NAT device is connected to the internet 21 and data passes through an aggregation point 17 and a carrier network 19. A fingerprinter 23 is connected to the system at the aggregation point 17. This is but one embodiment of the communications network B and a variety of other networks may be used in order to implement this disclosure.

Continuing on with FIG. 1, this embodiment shows two host computers 11, 13. The first host computer is shown as a laptop 11 and the second is shown as a desktop 13. It should be appreciated, however, that other pieces of equipment, besides laptops and desktops may be substituted in order to access the network. For example, a variety of access terminals may be used through this disclosure including a PDA device, a land line telephone, a Voice over Internet Protocol (VoIP) telephone, etc. Any device that has the capabilities of accessing the internet or a web server may act as a host computer. These devices alone, or in conjunction, may be substituted throughout this disclosure. Furthermore, this disclosure should not be limited to only two host computers. A NAT device 15 may support a number of different host computers at any given time.

This communication infrastructure also includes a NAT device 15. NAT is a technique of transceiving network traffic through a router that involves rewriting source and/or destination IP addresses. A NAT device 15 implements this procedure. Generally, NAT devices are used in order to enable multiple host computers onto a private network which allows access to the internet 21. NAT devices also hide the identities of the host computers behind them, including the number of host computers and operating systems used by the host computers.

The data, which is transferred through the NAT device 15, will meet at an aggregation point 17. An aggregation point is a central point where data is grouped together or collected to be received by a carrier network 19. The carrier network is connected to the internet 21. The internet and/or carrier network may also be substituted by an intranet or any other public or private network.

The system also includes a network user fingerprinter 23. The network user fingerprinter 23 is used in order to capture internet protocol packets which are used in obtaining a fingerprint. Through this disclosure, the network user fingerprinter 23 captures traffic in the network at the access or aggregation point 17. This provides the necessary information in order to determine the number of host computers and the operating systems being used. It should also be noted that the fingerprinter 23 may be a computer based device with fingerpainting software installed.

Now referring to FIG. 3, a snoop table 25 is provided. Through this disclosure, the network user fingerprinter 23 will leverage other processing sources that include captured data sessions. These captures would consist of application banners or system update requests. These sources provide detail to the operating system in question. For example, as shown in FIG. 3, a window system may send system details to the http based request for an update. The snoop table 25 indicates some of the information that could be captured and used to identify information about the operating system in question. In this example, this disclosure identifies that a system used wuredir.cab for a system update. This is reflected in the captured data section of the snoop table 25. This file is associated with defender update process for an XP system.

The second capture indicates an application capture for email using Mozilla. This capture is also reflected in the capture data section of snoop table 25. This information is stored in the next column. The capture heading shows that this is the second capture. This capture increases the probability that the system could be an XPSP 2 system. However, this capture does not confirm the operating system. Therefore, the computer ID for this system would continue to capture session information until it can verify the correct operating system.

Now referring to FIG. 4, a user index table is provided. The information captured from the snoop table 25 will form a probability which is stored in the user index table 35. At any given point a subscriber will have recorded information in the user index table 35. For new users to the system, profiles may be built with a new usage. At any given point, a profiling system can access the recorded information for analysis. The user index table 35 indicates a possible table for storing the necessary information. In this example, two computers have been fingerprinted. This is shown through the two different computer IDs. One computer is in XPSP2 and the other computer is possibly a Vista. In this example, the XPSP2 work station was determined by using TCP fingerprint technique which is known in the art. However, after going through the session processing, the system could only determine with a 60% possibility that computer ID 2 includes a Vista operating system.

Now referring to FIG. 4, an OS fingerprint table is provided. Once a profile has been created for a subscriber, the process will shift generally to a maintenance mode in order to reduce packet processing requirements. The sessions will only be scanned at configurable periods of time. These periods of time may vary depending on system requirements/preferences. The scan may be once every 30 minutes, every hour, once a day, once a week, etc. Because users tend to only update their PC with new PC purchase, or operating system releases, the data will generally stay the same in most occasions.

The OS fingerprint table 45 shows one example of an OS fingerprint table. The other embodiments may include a variety of different features. These tables may be dynamic over time as new information becomes available. The information provided in these tables may prove to be valuable in determining at an early stage, if a matching fingerprint exists.

It should be noted that all of these tables represent but a few embodiment of the tables that may be used in the system. The snoop table 25, user index table 35 and OS fingerprint table 45 may be combined and used in conjunction or split apart and used separately. Furthermore, the look and usage of these tables may vary, including the number of rows, columns and headings of each of these tables. These tables represent just one embodiment of how the system may be implemented. Variations of these tables may be used and still fit within the spirit of the claims.

Figure 6:
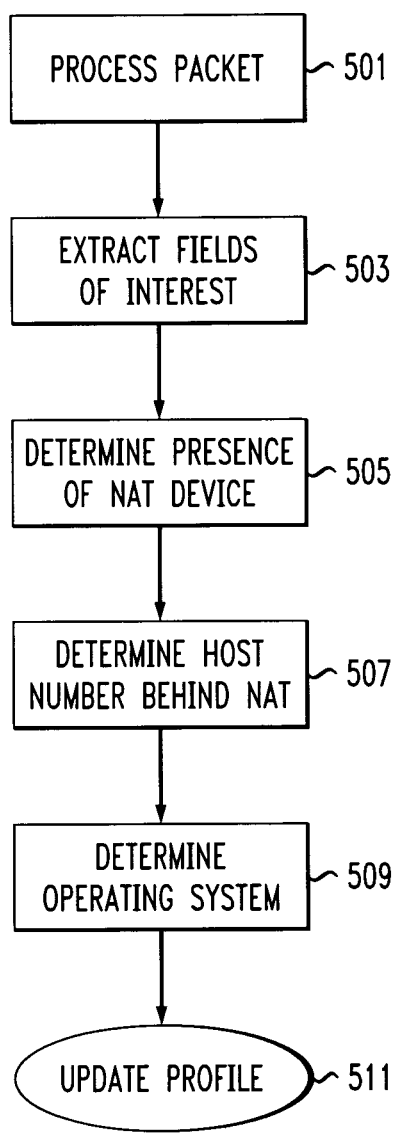
FIG. 6 illustrates a flow chart according to one embodiment of the method according to the present disclosure; and, FIG. 7 illustrates a more detailed flow chart illustrating one embodiment according to the present disclosure.

Now referring to FIG. 6, which is a flow chart representing a general overview of the processing of a packet in respect to this method. One advantage of this method is that several other factors may be used to increase the probability of a correct fingerprint. These factors include, but are not limited to, Internet Protocol Identifier (IPID), snooping for updated sessions and time differential.

Still referring to FIG. 6 which begins the method with capturing a packet (at step 505). Through this disclosure, a packet is captured at an aggregation point which will allow for the processing of the packet to contain data which will enable the system to determine the number of hosts and the operating system of those hosts behind a NAT device 15, FIG. 2.

The next step in the method is extracting fields of interest (at step 503). Because the packet was captured at an aggregation point 17, the packet may contain additional fields of interest which will enable the system to identify the number of computers behind the NAT device 15 as well as the operating systems. These key fields may be extracted and put into the snoop table 25, FIG. 3.

The next step in the method is determining the presence of a NAT device (at step 505). The presence of a NAT device 15 may be determined by analyzing the TTL number of the IP packet. This is described in further detail below in FIG. 7.

The method continues with determining the host number behind the NAT (at step 507). If it is determined that a NAT device 15 exists, it will be helpful to determine the number of host computers behind the NAT device 15. This may be done through an analysis of the IP identification field. One embodiment of this method is detailed in FIG. 7 below.

The method continues with determining the operating systems (at step 509). A variety of methods may be implemented in order to determine the operating system with a level of probability. These methods include utilizing an OS fingerprint table 45 in order to match processes, key fields, application data and update requested data until a positive fingerprint is found. The methods of doing this are also detailed in FIG. 7.

The final step in FIG. 6 is to update the profile (at step 511). Updating the profile will generally include updating the user index table 35. This table will often reflect a probability that the proper operating system has been found. If this probability is at 100%, the operating system will be verified. This may also be reflected in the user index table 35.

Figure 7:
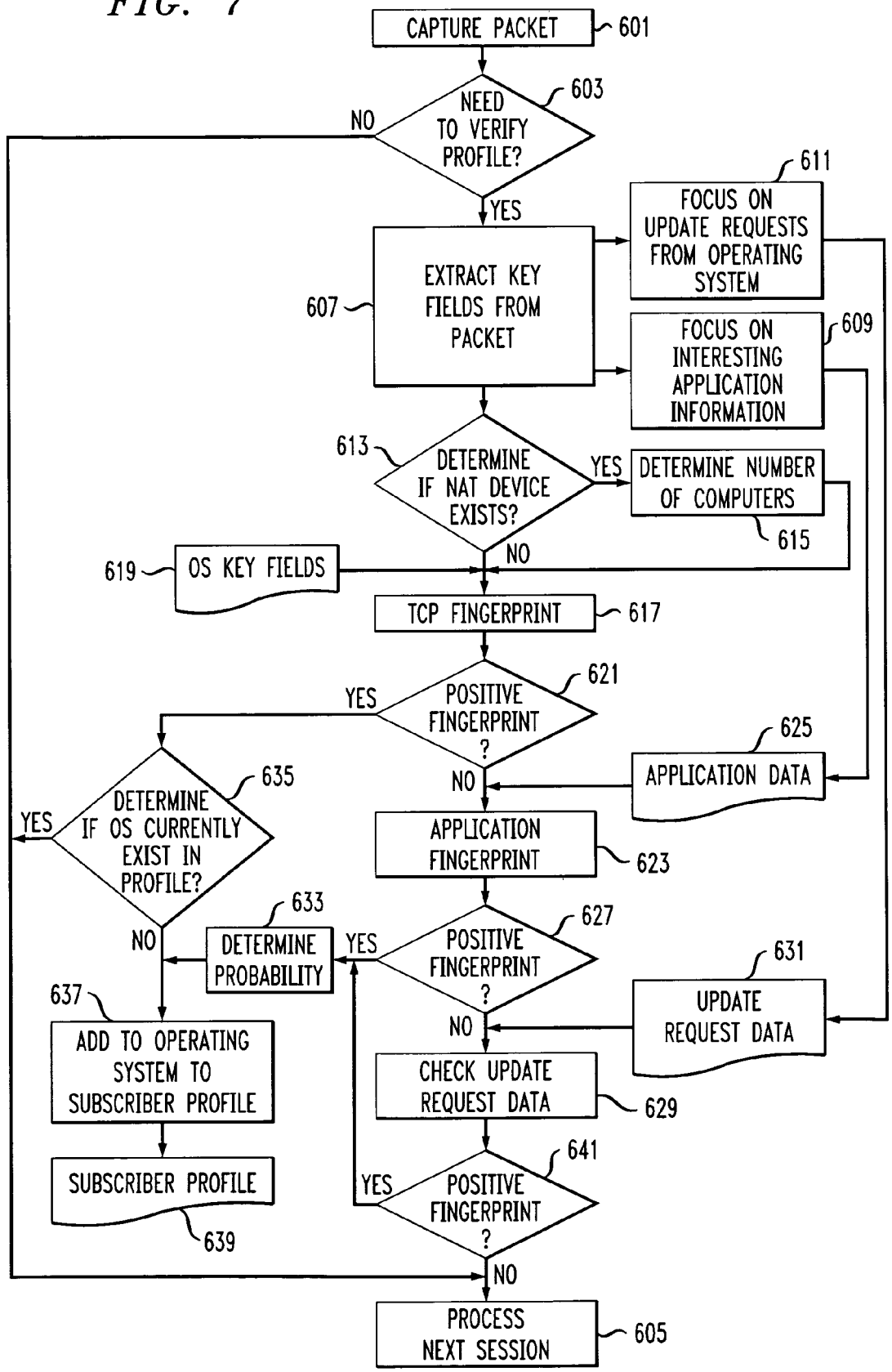

Now referring to FIG. 7, a more detailed embodiment, according to the present disclosure is provided. The method begins with the capture of an IP packet (at step 601). Generally, the IP packet will be captured at an aggregation point 17 so that it will contain certain key fields which will enable the present disclosure to determine with a higher level of probability, the operating systems being run by the host computers 11, 13, FIG. 2. Furthermore, these key fields will assist in determining whether a NAT device 15 exists and how many host computers are behind the NAT device 15.

The method continues with determining if a need to verify the profile exists (at step 603). In this embodiment, the system determines if session processing is useful by checking the current user index table 35 to see if the probability column shows 100% for that particular subscriber identification. If the subscriber identification as 100% in the user index table probability column, then the system is verified and there is no need to continue processing the packet because the operating system is already known. Furthermore, there is a determination to see if there is a need to create a new entry or collect more information for a current entry (e.g. an entry that has a probability less than 100%).

If there is no reason to verify the profile, the method continues with processing the next session (at step 605). In this form, the method would continue with a new packet.

However, if there is a need to verify the profile, key fields are extracted from the packet (at step 607). Key fields may include TTL, TOS, DF, MSS, window size, IP options and Internet Control Message Protocol (ICMP), echo request, payload pattern and length, if available, etc. Update requests and interesting application information are stored for additional processing, if needed. This information may be loaded at run time.

The next step in the method is determining if a NAT device 15 exists (at step 613). A NAT device 15 existence can be processed by analyzing the TTL number of the IP packet. The hop count from the subscriber Consumer Premise Equipment (CPE) 11, 13 to the capture point in the network is loaded at run time. If the observed TTL value plus the hop count comes out to a value which is a standard power of 2 or 255, then there is no NAT device 15 in front of the subscriber. However, if the observed TTL value plus the hop count comes to a value which is not a standard power of 2 or 255, then there is a NAT device in front of the subscriber.

The method continues with determining the number of computers (at step 615). If it is determined that there is a NAT device 15 present in the system, the next step is to find out how many computers are presently connected to the NAT device 15. In one embodiment, this is done by analyzing the IPID field from the IP packet header. The IPID field is generally implemented as a simple counter. As a consequence, consecutive packets emitted by a host will carry sequential IPID fields. Moreover, strings of consecutive IPIDs represent strings of consecutive packets from a given host. By counting the number of strings coming from a given IP address, the systems is able to determine how many hosts are really represented by that address. For example, if the IP ID of the first packet is 55, the second packet is 801, the third packet is 58 and the fourth packet is 807, one can determine that there are two host computers behind the NAT device 15.

Once the number of computers are determined, the method continues with TCP fingerprinting (at step 617). The TCP fingerprint, also known as a TCP stack fingerprint, is the process of determining the identify of a remote hosts' operating system by analyzing the packet from that host. The fingerprinting is done by sending TCP packets to a port and noticing how the TCP stack responds. Passive fingerprinting identifies remote operating systems of packets that are received without sending any packets. Active fingerprinting on the other hand, sends packets and waits for a response. Passive fingerprinting works in part because TCP/IP flags are specific to various operating systems. Therefore, these settings vary from one TCP stack implementation to another. However, using these key fields do not, in every circumstance, create a positive fingerprint.

The method continues (at step 621) with determining whether there is a positive fingerprint by analyzing whether the session information provided enough information for a positive match. This process involves matching the values captured compared to those stored of known operating systems. The values of known operating systems are stored in the OS fingerprint table 45.

Several methods can be used in order to determine whether the fingerprint is positive. In one embodiment, the method used is a logic tree. In another embodiment, hashed values of comparison values are used in order to determine whether the fingerprint is positive. If all fields match for a particular operating system, then it can be presumed that this session was generated from the matching operating system. However, if only some of these values match, then the closest matching operating system value is stored in the user index table 35 with a probability of accuracy. The probability may be determined by using key factors such as TTL, window size, TOS, MSS and IP options. Weight may be assigned to each value for determining a probability percentage. For example, using each of these fields and valuing each field at 20%, if three fields have a positive match, then the system may assume a probability of 60%. If only two field have a positive match the system may assume a probability of 40%, etc.

In one embodiment, if there is no probability that is a minimum of 50%, then the application processing would be completed. This involves referencing maintained application user agent information and determining that no match is close enough to continue. The probability may be adjusted depending on the desired accuracy of the system.

If there is a positive fingerprint (at step 635) the method continues with determining if the OS is currently in the profile. If the operating system is currently in the profile, then the process is completed for this session and the next session is processed (at step 605). However, if there is a positive fingerprint and the OS is not currently in the profile, then the operating system should be added to the subscriber profile (at step 637). This may involve adding subscriber profile data 639 to the user index table 35.

If the TCP fingerprint from step 617 is not positive (at step 621), then an application fingerprint may be produced (at step 623). This step involves focusing on interesting application information which was extracted (at step 609). The application data 625 is used in order to produce an application fingerprint (at step 623).

The method continues with once again testing to see if the fingerprint is positive (at step 629). If the fingerprint is positive, the method continues with (at step 633) determining the probability and adding the probability to the subscriber profile (at step 637). Again, (at step 637) the user index table 35 may be updated with subscriber profile information 639.

If the fingerprint is not positive, the method continues with checking update request data (at step 629). Update request key fields were extracted at step 611 in order to produce update request data 631. This update request data is then used in order to produce another fingerprint (at step 629).

The method continues with checking to see if the fingerprint produced a positive fingerprint (at step 641). If no match is found in the application processing, the system may look in the processing snooped captures in the snoop table 25. This process involves extracting data from snoop data such as operating system version. For many operating systems, the updated process information is transmitted over clear text and will clearly identify the operating system in question. If this provides the necessary information of the operating system, then the profile table is updated to reflect this 100% probability at step 637. At this point, if a 100% probability of a match does not exist, then the next session is processed to find the necessary information. However, if a profile has been verified to 100%, then the session from this subscriber are only processed after a configurable period of time to minimize the system resources has been met. If the profile does not identify an operating system with at least 50% probability the information is generally not added to the user index table 35. However, in one embodiment, this information is always added to the snoop table 25.

The above described embodiments that were shown in FIGS. 5 and 6 present but one embodiment of the above-described disclosure. Implementation of the various network elements in steps that they perform depend on how the system is used. These functions may be performed by some or all of the various network elements in conjunction or separate from one another. Furthermore, variations to the network elements and steps of the method may exist. Descriptions of these embodiments is not meant to limit the claims but instead show how some of the embodiments of the methods may be used.

The above description merely provides a disclosure of the particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

The invention claimed is:

1. A method for identifying the number of computers and types of operating systems behind a network address translator, comprising:

processing an internet protocol packet associated with at least one host computer system including capturing said internet protocol packet at a point between the at least one host computer system and a network and extracting fields from said internet protocol packet to produce a fingerprint;

analyzing said fields to determine if an associated network address translator is connected between said at least one host computer system and the point at which the internet protocol packet was captured;

if said network address translator is connected, analyzing said fields to determine the number of host computer systems behind said associated network address translator;

analyzing said fields to determine with a level of probability that said fingerprint identifies an operating system running said at least one host computer system;

recording subscriber information for subscribers associated with the at least one host computer system in a user index table; and generating a subscriber profile from the subscriber information in the user index table if the at least one host computer system has not been previously fingerprinted.

2. The method according to claim 1, further comprising processing update requests for said operating system in the captured internet protocol packet in order to further define said level of probability.

3. The method according to claim 1, further comprising accessing application data in the captured internet protocol packet in order to further define said level of probability.

4. The method according to claim 1, wherein analyzing said field includes comparing captured values from said internet protocol packet to values stored for known operating systems.

5. The method according to claim 4, wherein comparing captured values includes accessing an operating system fingerprint table.

6. The method according to claim 4, wherein comparing captured values include utilizing a logic tree.

7. The method according to claim 4, wherein comparing captured values includes utilizing hashed values.

8. A method of analyzing network traffic comprising:

capturing a packet from a data path at a point between a host and a network;

extracting application data, update request information and operating system key fields from said packet;

performing a determining test to determine a number of hosts behind a network address translation device and a transmission control protocol fingerprint test, an application fingerprint test, and an update request fingerprint test to identify operating systems running on the hosts or to confirm that the operating system for one or more host cannot be identified during this session;

if the network address translation device between the host and the point at which the packet was captured is providing the host with access to said network, determining the number of hosts behind said network address translation device based at least in part on information extracted from the packet in conjunction with the determining test;

accessing the extracted operating system key fields in order to perform the transmission control protocol fingerprint test;

if said transmission control protocol fingerprint test is not positive, using the extracted application data in order to perform the application fingerprint test; and if said application fingerprint test is not positive, using the extracted update request information to perform the update request fingerprint test;

if the update request fingerprint test is not positive, comparing the extracted update request information to snoop data in a snoop table;

if the extracted update request information does not match any snoop data in the snoop table, processing for this session is over and further processing in another session is required to identify an operating system running on at least one host behind the network address translation device.

9. The method according to claim 8, wherein said operating system key fields include a time differential.

10. The method according to claim 8, wherein said operating system key fields include an internet protocol identifier.

11. The method according to claim 8, further comprising accessing a user index table for verification that an operating system for the host has not previously been verified.

12. The method according to claim 8, wherein said fingerprint is positive if it has a 100% probability of identifying an operating system for the host.

13. A system for identifying the number of computers and types of operating systems behind a network address translation device, comprising:

at least one processor and associated memory, wherein the at least one processor is configured to execute a network user fingerprinter;

wherein the network user fingerprinter configured to capture internet protocol packets at a point between one or more host and a network and to use the internet protocol packets in obtaining a fingerprint for at least one host;

wherein the network user fingerprinter is configured to obtain update request data, application information and key fields from said internet protocol packets;

wherein the network user fingerprinter is configured to analyze the Time To Live (TTL) number from said key fields of said internet protocol packets and determine the presence of a network address translation device between the one or more host and the point at which the internet protocol packets were captured;

wherein the network user fingerprinter is configured to analyze the update request data, application information, and key fields to determine the number of hosts behind the network address translation device;

wherein the network user fingerprinter is configured to analyze the fields to determine with a level of probability that the fingerprint identifies an operating system running the at least one host;

wherein the network user fingerprinter is configured to record subscriber information for subscribers associated with the at least one host in a user index table;

wherein the network user fingerprinter is configured to generate a subscriber profile from the subscriber information in the user index table if the at least one host has not been previously fingerprinted.

14. The system according to claim 13, wherein the point at which the internet protocol packets were captured includes a network traffic aggregation point and said network user fingerprinter is configured to perform the capturing of the internet protocol packets on traffic at the network traffic aggregation point.

15. The system according to claim 14, where the network includes a public network associated with the network address translation device and said aggregation point is located between said network address translation device and the associated public network.

16. The system according to claim 13, further comprising a snoop table storing information from the captured internet protocol packets relating to operating systems for each host in question, wherein the stored information is used in conjunction with obtaining said fingerprint.

17. The system according to claim 13, further comprising an operating system fingerprint table storing values for known operating systems which is adapted to be dynamic, wherein the stored values are used for comparisons with information obtained from the captured internet protocol packets in conjunction with obtaining said fingerprint.

18. The system according to claim 13, further comprising a user index table storing a closest matching operating system for each host in question and a probability of accuracy for the closest match in conjunction with obtaining said fingerprint.

* * * * *